Nov. 23, 1926.
R. S. RILEY
SIDE RETORT STOKER
Filed April 22, 1922
1,607,914
7 Sheets-Sheet 1
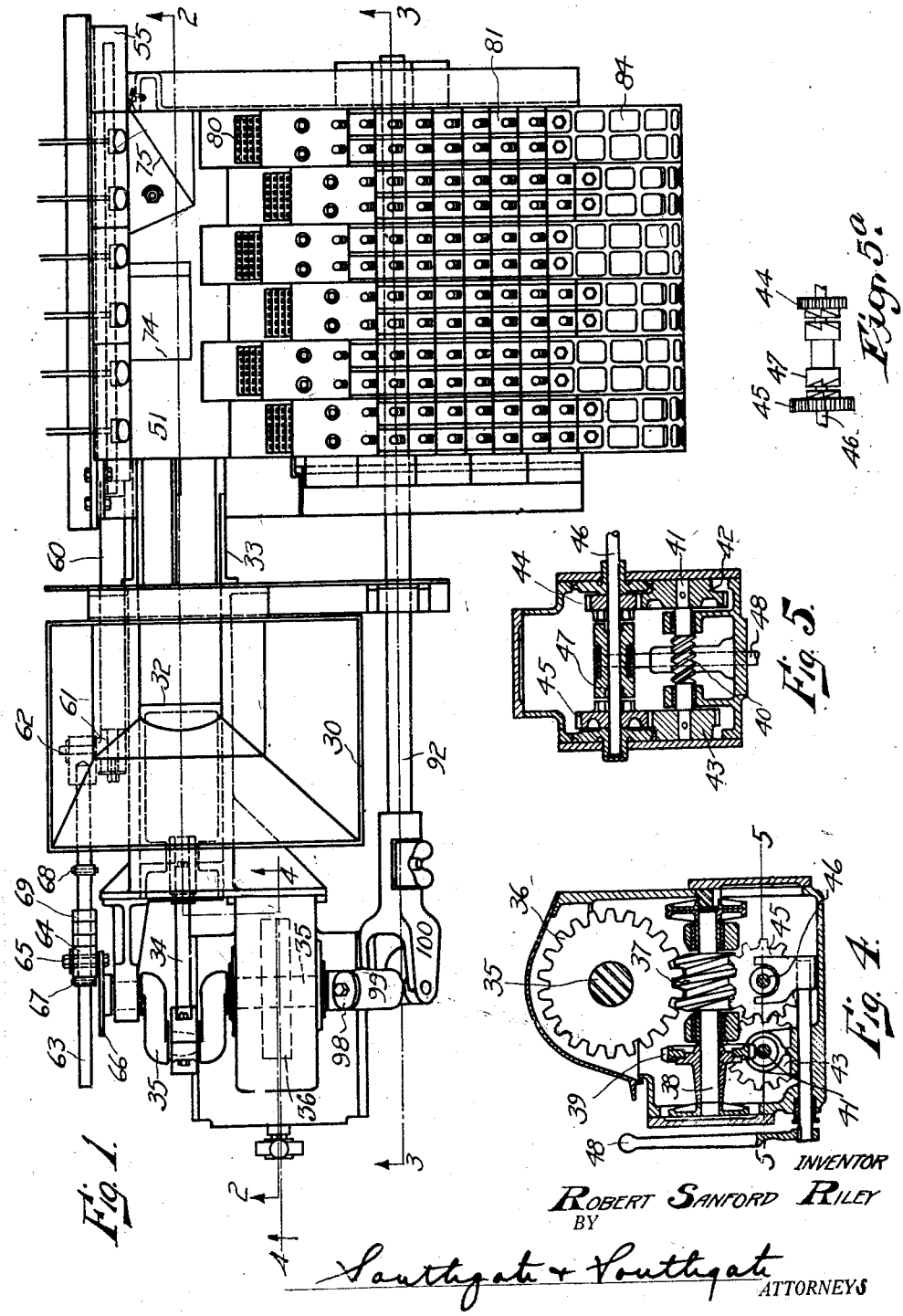
INVENTOR
Robert Sanford Riley
BY
Southgate & Southgate
ATTORNEYS

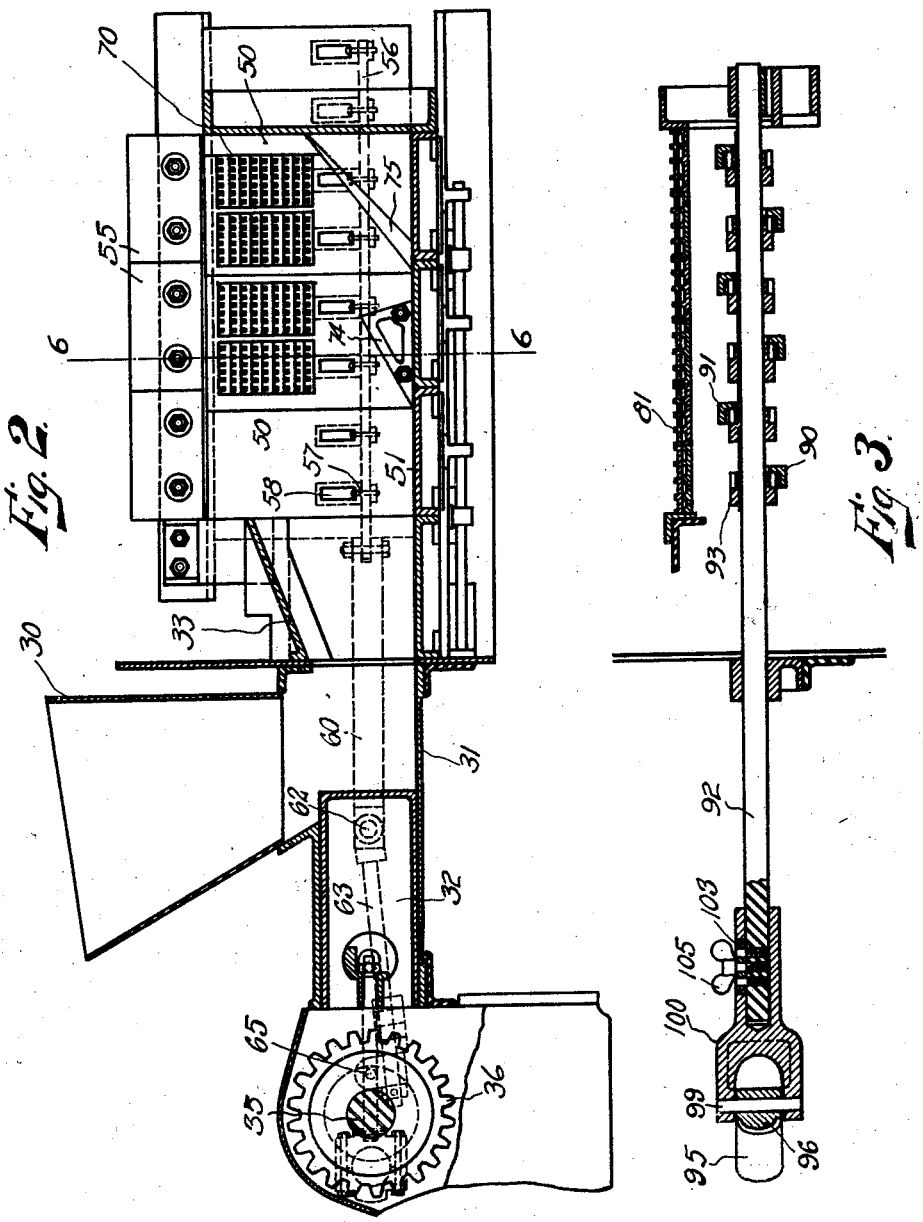

Nov. 23, 1926.    1,607,914
R. S. RILEY
SIDE RETORT STOKER
Filed April 22, 1922    7 Sheets-Sheet 3
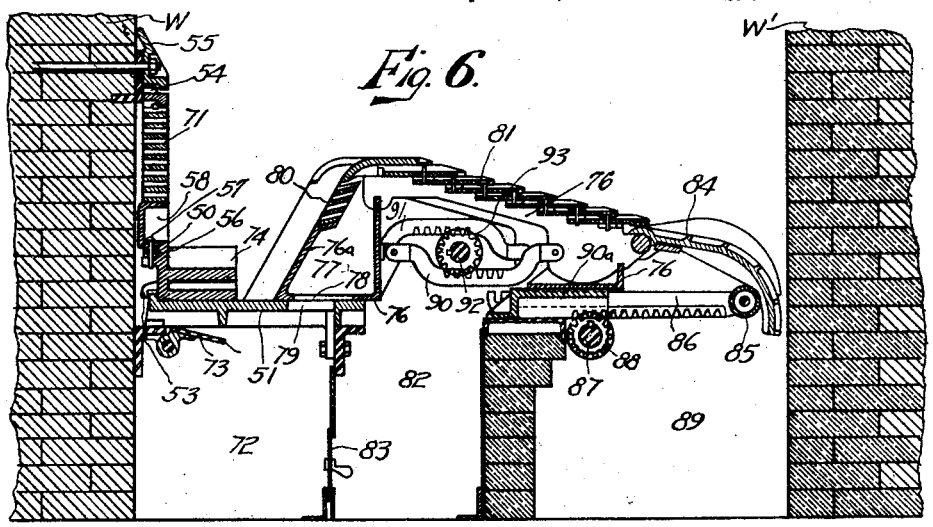
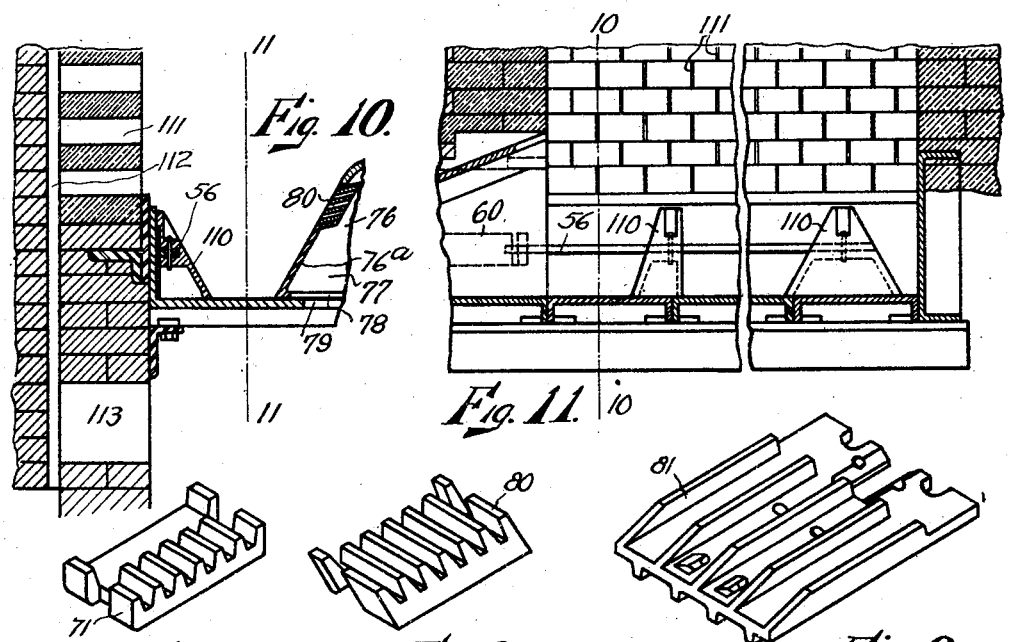
INVENTOR.
ROBERT SANFORD RILEY
BY
Southgate & Southgate
ATTORNEYS Nov. 23, 1926.  1,607,914
R. S. RILEY
SIDE RETORT STOKER
Filed April 22, 1922    7 Sheets-Sheet 4

INVENTOR.
ROBERT SANFORD RILEY
BY
Southgate & Southgate
ATTORNEYS

Nov. 23, 1926. 1,607,914
R. S. RILEY
SIDE RETORT STOKER
Filed April 22, 1922    7 Sheets-Sheet 5
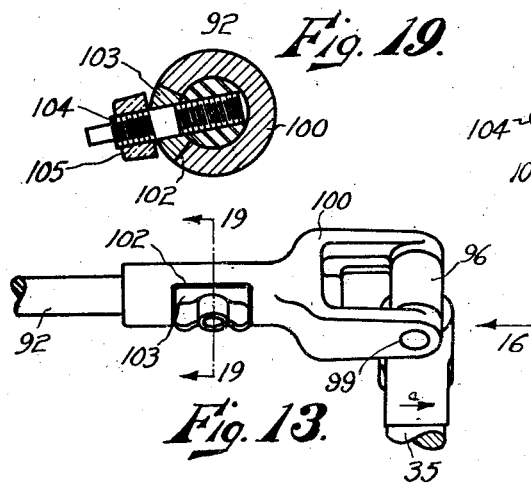
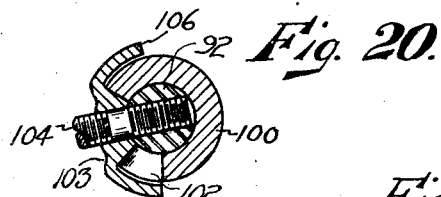
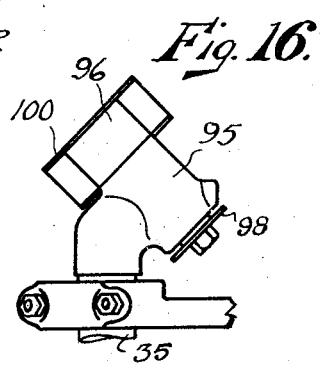
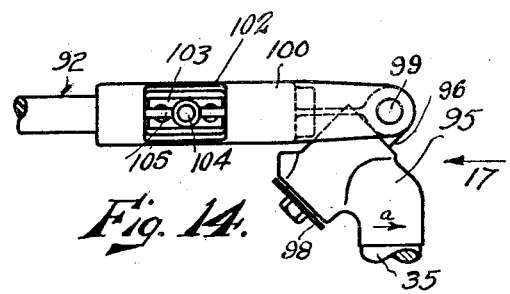
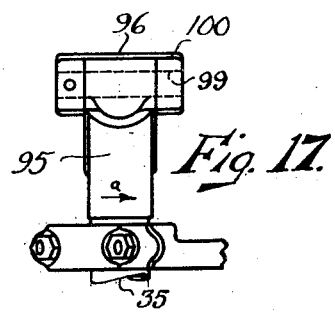
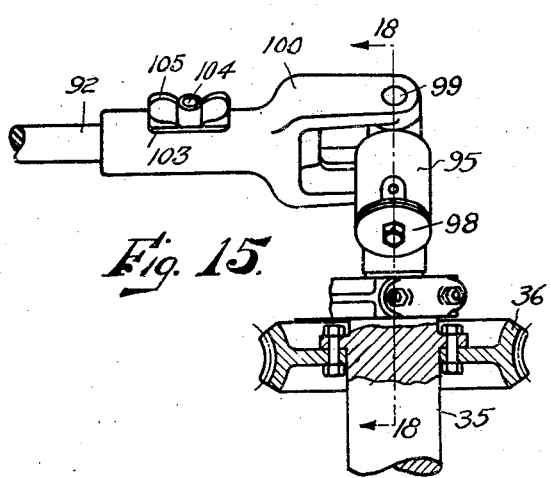
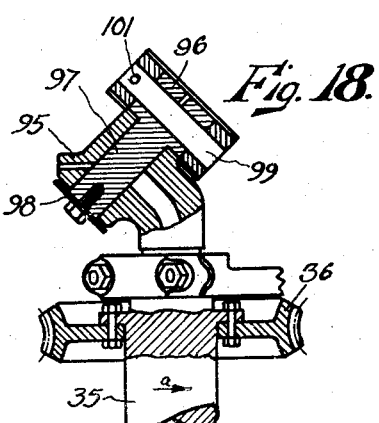
INVENTOR.
ROBERT SANFORD RILEY
BY
Southgate & Southgate
ATTORNEYS

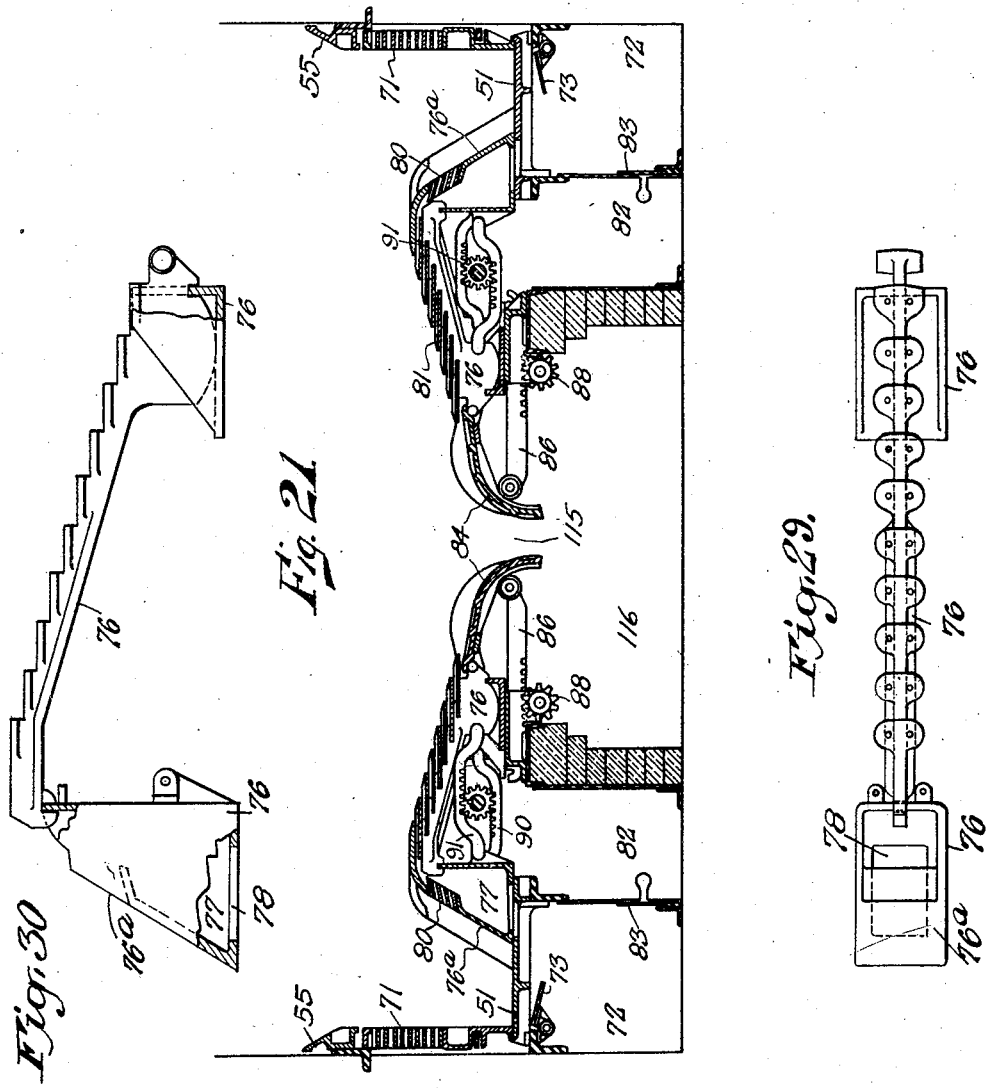

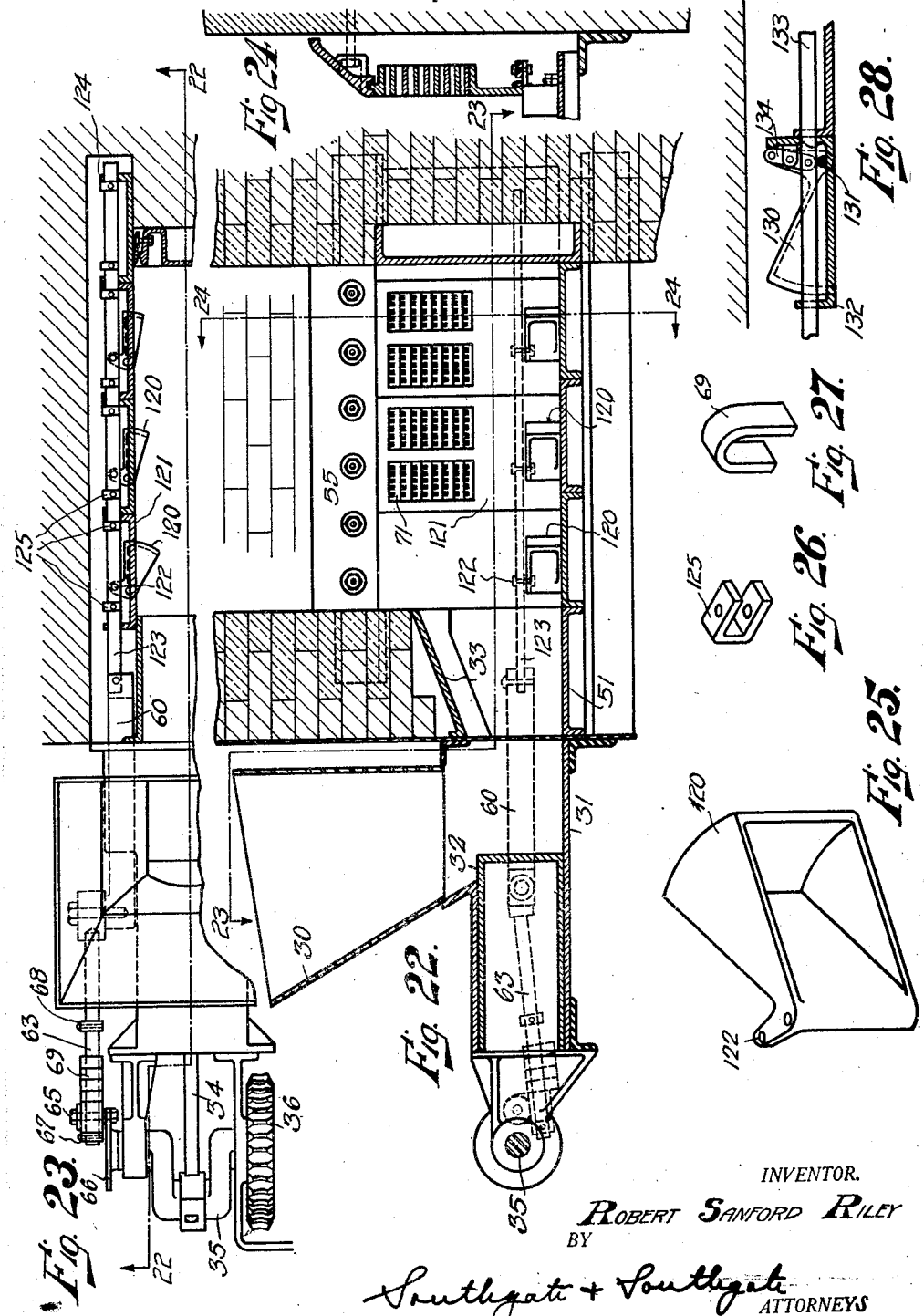

Patented Nov. 23, 1926.

1,607,914

UNITED STATES PATENT OFFICE.

ROBERT SANFORD RILEY, OF WORCESTER, MASSACHUSETTS, ASSIGNOR TO RILEY STOKER CORPORATION, OF WORCESTER, MASSACHUSETTS, A CORPORATION OF MASSACHUSETTS.

SIDE RETORT STOKER.

Application filed April 22, 1922. Serial No. 556,012.

This invention relates to an underfeed stoker of the type in which fuel is fed to the retort at the front end of the stoker and in which the ash and refuse are discharged transversely of the retort. Such stokers are particularly adapted for use in locations where the depth of the stoker from front to back is limited, and it is the general object of my invention to provide a stoker for such conditions which will give a maximum travel of the fuel between the point of entrance of the fresh fuel and the point of discharge of the ash and refuse.

This is a matter of great importance in stoker operation by which the opportunity for complete combustion of the fuel before discharge as refuse is materially increased.

More specifically, it is the object of my invention to provide a stoker having a retort positioned adjacent one side wall of the furnace, with the refuse discharge taking place transversely of the retort and preferably adjacent the opposite side wall. Under certain circumstances, as in the case of a very wide but short furnace, two oppositely disposed stokers may be used with a common central ash discharge.

A further object of my invention is to provide a stoker in which the outer wall of the retort is reciprocated lengthwise thereof to distribute the fuel along the retort length. The other side wall of the retort is formed by the ends of transversely reciprocating overfeed side grates.

An important feature of my invention relates to the novel mechanism which I have devised for thus transversely reciprocating the side grates of the stoker.

Other features of my invention relate to the distribution and control of the air supply for different parts of the stoker and to certain arrangements and combinations of parts which will be hereinafter described and more particularly pointed out in the appended claims.

A preferred form of my invention, together with certain modifications thereof is shown in the drawings in which—

Fig. 1 is a plan view of my improved stoker;

Fig. 2 is a sectional elevation taken along the lines 2—2 in Fig. 1;

Fig. 3 is a sectional elevation taken substantially along the line 3—3 in Fig. 1, but with certain parts in a different angular position;

Fig. 4 is a sectional elevation of the stoker actuating mechanism, taken along the line 4—4 in Fig. 2;

Fig. 5 is a sectional plan view taken along the line 5—5 in Fig. 4;

Figure 12A:
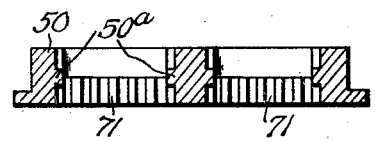
Figure 12:
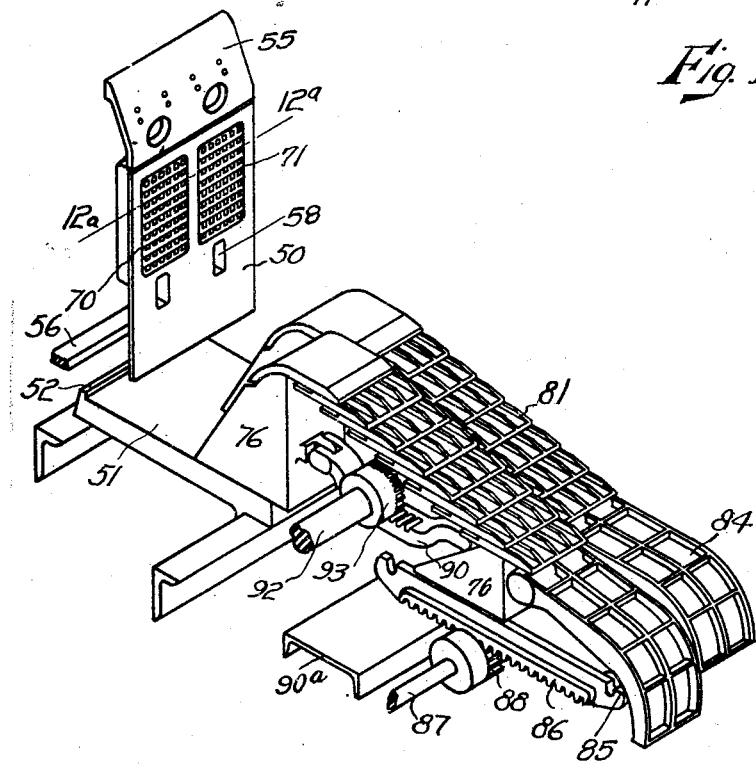

Fig. 5$^a$ is a side view of the clutch connection shown in Fig. 5;

Fig. 6 is a transverse sectional elevation taken along the line 6—6 in Fig. 2;

Figs. 7, 8 and 9 are perspective views of different tuyère and grate blocks;

Fig. 10 is a a transverse sectional elevation of a modification, taken along the line 10—10 in Fig. 11;

Fig. 11 is a longitudinal sectional elevation, taken along the line 11—11 in Fig. 10;

Fig. 12 is a perspective view of certain units of my invention as shown in Figs. 1 to 6;

Fig. 12$^a$ is a detail sectional view, taken on the line 12$^a$—12$^a$ in Fig. 12;

Figs. 13, 14 and 15 are plan views of the mechanical connection between the crank shaft of my improved stoker and the side grate oscillating shaft, the parts being shown in three different positions;

Figs. 16 and 17 are end views looking in the direction of the arrows 16 and 17 in Figs. 13 and 14 but showing certain additional parts;

Fig. 18 is a sectional end view, taken along the line 18—18 in Fig. 15;

Fig. 19 is a detail sectional view, taken along the line 19—19 in Fig. 13;

Fig. 20 is a view similar to Fig. 19 but showing certain parts in different proportions;

Fig. 21 is a transverse sectional elevation, partly diagrammatic of a double stoker embodying my improvements;

Fig. 22 is a sectional elevation of a further modification, taken along the line 22—22 in Fig. 23;

Fig. 23 is a partial plan view, partly in section, taken along the line 23—23 in Fig. 22.

Fig. 24 is a partial transverse sectional elevation, taken along the line 24—24 in Fig. 22;

Figs. 25, 26 and 27 are perspective views of detail parts;

Fig. 28 is a detail sectional plan view of an additional modification, and

Figs. 29 and 30 are a plan view and side elevation respectively of one of the side retort frames.

Referring to the preferred form of my invention, as shown particularly in Figs. 1 to 6 and 12, I have disclosed a stoker having a retort adjacent one side wall of the furnace and having provision for ash discharge at the opposite side of the furnace.

My improved stoker comprises a hopper 30 from which coal or other fuel is delivered to a partially cylindrical casing 31 (Fig. 2) from which it is forced into the front end of the retort by a ram or plunger 32. The fuel is delivered by the ram through an inwardly enlarged feed chute 33 which opens at its inner end directly into the retort of the stoker.

The ram 32 is connected by a rod 34 (Fig. 1) to a crank shaft 35 by which it is regularly reciprocated. The means shown for rotating the shaft 35 includes a large worm gear 36 (Fig. 4) driven by a worm 37 on a horizontal shaft 38 which in turn is provided with a worm gear 39 similarly engaged by a worm 40 (Fig. 5) on a short shaft 41.

Gears 42 and 43 are fixed to the shaft 41 and are engaged by gears 44 and 45 loose on a driving shaft 46 which is continuously rotated from any convenient source of power (not shown). A clutch collar 47 is manually slidable on the shaft 46 by means of the handle 48 (Fig. 4), and is provided with clutch teeth at each end adapted to engage similar teeth on the inner faces of the gears 44 and 45.

Provision is thus made for maintaining driving connection from the shaft 46 to the crank shaft 35, either through the change gears 44 and 42 or through the gears 45 and 43, according to the speed ratio desired.

The outer wall of the retort comprises a number of plates or frames 50 (Fig. 12), supported at their lower ends upon a plate or plates 51 which form the bottom of the retort. A flange or rib 52 at the outer edge of the plates 51 forms a guide for the plates 50 and hook-shaped projections 53 on the plates 50 (Fig. 6) engage the outer face of the flange 52 and hold the plates 50 from displacement.

At their upper ends, the plates 50 may be provided with projections 54 (Fig. 6) positioned behind a depending rib on the under side of a guide-plate 55 bolted to the side of the furnace. The plates 50 are thus mounted for sliding movement longitudinally of the retort.

A bar 56 extends longitudinally behind the plates 50 and is connected to each plate by a pin 57 (Fig. 6), extending through openings in certain projections on the rear of the plates 50. Pockets or recesses 58 are formed in the outer faces of the plates 50 to permit convenient insertion or removal of the pins 57.

The bar 56 is connected at its forward end to a slide 60 (Fig. 1) to which is secured a head 61 having a stud 62 on which is pivoted one end of a rod 63. The rod 63 extends loosely through a block 64 pivoted at 65 to a disk 66 mounted on the end of the crank shaft 35.

Collars 67 and 68 limit the sliding movement of the block 64 on the rod 63, the block engaging the collars alternately at each rotation of the crank shaft and thus having a lost-motion connection therewith, through which the bar 56 may be intermittently reciprocated. U-shaped collars 69 (Figs. 1 and 27) may be mounted on the rod 63 to reduce the amount of lost motion, correspondingly increasing the reciprocating movement of the bar 56 and the retort wall plates 50.

Rectangular openings 70 (Figs. 2 and 12) are formed in the side plates 50 to receive tuyère blocks 71 (Fig. 7), which are secured therein to form air admitting portions in each plate 50. The blocks 71 have notches at their ends (Fig. 7) fitting ribs 50$^a$ at the sides of the openings 70, as shown in Fig. 12$^a$, said ribs preventing displacement of the blocks. The ribs 50$^a$ may be cut away at their extreme upper ends to permit insertion of the blocks 71. Air under pressure is supplied to these tuyère blocks from the back side thereof, the air being admitted to the space between the plates 50 and the side wall W from an air trunk 72, with the flow of air controlled by a damper 73 suitably mounted for manual adjustment. Reference to Figs. 2 and 12 will show that there is ample air space between the pockets 58 to permit the upward flow of an adequate supply of air to the blocks 71.

The openings 70 are commonly omitted from the plate 50 nearest the front furnace wall, to prevent combustion at this point where injury to the wall would probably occur.

One or more wedge-shaped members 74 (Fig. 2) may be bolted to the inner face of the side wall plates 50 to assist in the rearward and upward movement of the fuel in the retort. A fixed wedge or plow 75 may also be secured at the rear end of the retort to facilitate the elevation and discharge of the fuel laterally from this portion of the retort.

The construction thus far described provides for feeding the fuel from the hopper to the retort at a desired rate of feed, for distributing the fuel rearward in the retort, and for supplying a certain amount of air under pressure to the fuel in the upper part of the retort so that the initial stages of combustion may be supported therein.

The opposite wall of the retort is formed by a plurality of side grate members comprising frames 76 (Figs. 6, 29 and 30). The left hand portion of each frame 76 (as viewed in Fig. 6) is formed as a hollow chamber 77 having an opening 78 in the bottom aligned with a similar opening 79 in the top of the air chamber 72.

Tuyère blocks 80 (Fig. 8) are mounted in the upper portion of that part 76ª of the frame 76 which forms the second side wall of the retort, the part 76ª being formed at a relatively abrupt incline. Additional blocks 81 (Fig. 9) are mounted on the long outer slope of the frame 76 and these blocks form an overfeed grate which receives air under pressure from a second air chamber 82 (Fig. 6). A damper 83 controls the flow of air from the air chamber 72 to the air chamber 82.

Ash discharging or dumping plates 84 are pivotally mounted on the outer ends of the frames 76 and are guided in their paths of movement by rolls 85 on the ends of rack bars 86. The bars 86 and rolls 85 may be adjusted in or out by manually rotating a shaft 87 having a plurality of pinions 88 meshing with the different rack bars 86.

By adjusting these rack bars in one direction or the other, the width of the ash discharge opening between the plates 84 and the side wall W' may be adjusted as desired. Ash and refuse passing through the discharge opening are received in the usual ash pit 89.

As indicated in the drawings, the side grate members, including their supporting frames 76, are mounted for lateral reciprocation. For this purpose, certain of the side grate frames are provided with depressed rack bars 90 (Fig. 6) having teeth on their upper edges and the alternate frames are provided with elevated rack bars 91 having teeth on their lower edges. The frames 76 are slidably supported at one end by the retort bottom plates 51 and at the other end by a stoker frame member 90ª.

A shaft 92 extends rearward of the furnace under all of the side grate members and is provided with gears 93 (Figs. 3 and 6) meshing with the rack bars 90 and 91. As the shaft 92 is oscillated, it is evident that adjacent side grate members will receive lateral sliding movements in opposite directions.

I have provided a special mechanism by which the shaft 92 may be thus oscillated directly from the continuously rotating crank shaft 35. This mechanism is shown in Fig. 1 and in more detail in Figs. 13 to 19, and comprises a bearing member 95 fixed to the end of the crank shaft 35 and disposed at an oblique angle thereto. This angle may be varied to produce different arcs of oscillation and in the particular example shown in the drawings is an angle of 45 degrees.

A block 96 (Fig. 18) has a shank 97 pivoted in the bearing 95 and is held from axial movement therein by a disk or washer 98 fixed to the end of the shank. A cross pin 99 extends loosely through a transverse bearing in the block 96 and the ends of the pin 99 are received in the two arms of a yoke 100, loosely mounted on the shaft 92. Axial displacement of the cross pin 99 may be prevented in any convenient manner as by a pin 101 (Fig. 18).

A recess 102 (Figs. 13 and 19) in the hub of the yoke 100 is adapted to receive a block 103, mounted on a stud 104, fixed in the shaft 92 and having a nut 105 to prevent displacement of the block. The block 103 may fit closely in the opening 102, as in Figs. 13 and 19 or more or less loosely as in Fig. 20. The block 103 is preferably also provided with shield-like extensions 106, which cover the opening 102 in all positions thereof, thus preventing the crushing of a finger by the block 103 as it oscillates from one end to the other of the opening 102.

As the shaft 35 continually rotates in the direction of the arrow a, the parts assume the successive positions indicated in Figs. 13 to 18. Assuming the parts to be in the position shown in Figs. 13 and 16, the yoke 100 will be at the extreme end of its oscillative movement in an anti-clockwise direction.

Continued movement of the shaft 35 will bring the yoke 100 to the mid-position shown in Figs. 14 and 17 at the end of a quarter revolution of the shaft 35 and at the end of an additional quarter revolution, would bring the yoke 100 to the opposite extreme of its oscillative movement, as indicated in Figs. 15 and 18. The next half revolution of the shaft 35 would reverse the movement of the yoke 100 and restore the parts to the position shown in Figs. 13 and 16.

If the block 103 is of less length than the opening 102, as indicated in Fig. 20, there will be a period of rest for the shaft 92 at each reversal of the movements of the yoke 100 and the arcs of movement of the shaft 92 will be correspondingly reduced. Furthermore, the arc of oscillation of the yoke 100 may be varied within rather wide limits by mounting the bearing 95 at different angles with the shaft 35, the arc of oscillation being reduced as the angle between the shafts is reduced.

Having fully described this part of my invention, it will be seen that I have provided mechanism for directly connecting a continuously rotating shaft with an oscillating shaft and for producing an oscillative movement of the latter of any desired extent, also providing a greater or less dwell at each reversal of movement if so desired. This transformation of movement is accomplished with few and simple parts which may be easily made and which are capable of transmitting heavy torsional forces.

In Figs. 10 and 11, I have shown a construction in which the retort side plates 50 and tuyère blocks 71 are replaced by a simpler construction. In this modified structure, the bar 56 is connected to one or more inclined blocks or wedges 110 mounted to slide in the lower corner of the retort adjacent the outer wall. Air is admitted to the upper part of the retort through a fixed ventilated side wall structure which may be of any usual form and is shown herein as comprising spaced fire-brick having air openings 111 at each side of each brick, these openings being connected through a flue 112 and a passage 113 to the chamber 72 previously described. The remaining parts of this form of stoker and the method of operation thereof are similar to the preferred form.

In Fig. 21, I have shown my improved stoker adapted to a very wide furnace, in which case a common ash discharge opening 115 is provided between oppositely disposed rocking dump plates 84 and a common ash pit 116 receives the ash and refuse thus discharged, the construction otherwise being similar to that already described.

The method of operation of my improved stoker will be clear from the preceding description, but may be summarized as follows: The fuel is placed in the hopper 30 from which it is fed to the front end of the retort by the ram 32.

The moving side wall plates 50 slowly distribute the fresh fuel rearward in the retort, this action being accelerated when the wedge-like blocks 74 are used. The natural resistance of the fuel to such longitudinal movement causes the fuel to rise in the retort and to gradually overflow the side wall formed by the ends 76ᵃ of the side grate members. The abrupt slope of these ends aids in elevating the fuel from the bottom of the retort.

The fuel while in the retort receives air under pressure through the tuyère blocks 71 and 80, or through the wall openings 111 (Fig. 10) and the usual gas distilling and coking process preliminary to combustion is thus begun in the retort. This process is continued and the combustion of the fuel is completed as the fuel gradually moves downward over the overfeed grate blocks 81, such movement being accelerated by the lateral reciprocation of the side grate members. The ash and refuse are deposited upon the dumping plates 84 by which it is discharged into the ash pit 89. The fuel thus travels the full width of the furnace from one side wall W to the opposite side wall W′ and a substantially longer period of combustion is permitted than can be attained in the side discharge furnaces heretofore known in which the fuel is fed to the middle of the furnace and is discharged from each edge thereof.

In Figs. 22 to 26, I have shown a modified structure replacing the wedge or plow 74, shown in Figs. 2 and 6. In the modified structure, coal pushers 120 (Figs. 23 and 25) are pivoted in openings in the lower portions of retort side plates 121 and are also pivotally connected at 122 to a bar 123, actuated by the slide 60 previously described.

The bar 123 is slidable in openings in rearwardly extending flanges 124 on the plates 121 and is provided with collars or blocks 125 (Fig. 26) secured to the bar between the flanges 124 and engaging these flanges to reciprocate the side plates as the bar approaches each end of its path of travel.

As the bar 123 moves rearward in the furnace or to the right in Fig. 23, it will swing the pushers 123 outward to the position shown in Fig. 23, before the rearward collars 125 engage the flanges on the plates 121 and move the plates and pushers rearward. When the bar 123 moves forward, the pushers 120 are withdrawn so that they do not project beyond the faces of the plates 121 on their forward or return movement.

Each pusher 121 is recessed on its outer face as clearly shown in Fig. 25 so that it need displace only a small portion of fuel as it is moved outward to operative position. This arrangement of mechanism gives positive rearward feed of the fuel with much less disturbance of the fuel as the pushers move forward.

In Fig. 28, the pushers 130 are pivoted at 131 at the rear or right hand edges of the openings in the wall plates 132 and the sliding bar 133 is connected to the pushers through levers 134 by which the direction of movement is reversed. The members 130 are moved outward into the fuel as the bar 133 moves rearward and are withdrawn as the bar moves forward as in the form previously described.

Having thus described my invention and certain modifications thereof, it will be evident that other changes and modifications can be made therein by those skilled in the art within the spirit and scope of my invention as set forth in the claims, and I do not wish to be otherwise limited to the details herein disclosed, but what I claim is:—

1. An underfeed stoker having a retort with a longitudinally movable wall forming one side thereof, a plurality of overfeed members movable transversely with respect to said retort and forming the opposite side of said retort, and means to move said wall and said members.

2. An underfeed stoker having a retort with an air admitting wall forming one side of said retort means to move said wall longitudinally of said retort, a plurality of overfeed grate members movable transversely with respect to said retort and forming the opposite side of said retort, and means to move said grate members transversely of said retort.

3. An underfeed stoker having a retort with a longitudinally movable side wall, said wall having air admitting tuyère blocks mounted therein, a plurality of overfeed side grate members movable transversely with respect to said retort and forming the opposite side of said retort, and means to move said wall and said side grate members.

4. An underfeed stoker having a retort with a longitudinal movable side wall, grate members forming the opposite side of said retort and movable transversely with respect to said retort and fuel engaging means on said wall, and means to reciprocate said wall and said grate members along lines substantially perpendicular to each other.

5. An underfeed stoker having a retort at one side, a refuse discharge opening at the opposite side, said retort having a movable side wall, means to move said wall longitudinally to distribute fuel in said retort, overfeed grate members effective to advance the fuel from the retort to the discharge opening, means to alternately reciprocate said grate members, said members forming one side wall of the retort and having openings in the portions thereof adjacent said retort, and a plurality of tuyère blocks mounted in said openings.

6. An underfeed stoker having a retort at one side, a refuse discharge opening at the opposite side, said retort having a movable side wall, means to move said wall longitudinally to distribute fuel in said retort, overfeed grate members effective to advance the fuel from the retort to the discharge opening, and means to alternately reciprocate said grate members, said members having an abrupt slope adjacent said retort and a more gradually inclined portion on which overfeed combustion is maintained, said latter portion comprising a plurality of step-like overlapping air admitting grate blocks.

7. An underfeed stoker comprising a retort having a side wall fixed transversely with respect to said retort but movable longitudinally, and having its opposite side wall fixed longitudinally but movable laterally, said opposite side wall comprising a plurality of overfeed grate members, and means to reciprocate said walls.

8. An underfeed stoker comprising a retort having one side wall fixed transversely with respect to said retort but movable longitudinally, and having its opposite side wall fixed longitudinally but movable transversely with respect to said retort, said walls having openings therein, tuyère blocks in said openings, means to supply air under pressure to said tuyère blocks, and means to reciprocate said walls.

9. An underfeed stoker comprising a retort having one side wall fixed transversely with respect to said retort but movable longitudinally, and having the opposite side wall formed of elements fixed longitudinally but movable transversely with respect to said retort, said latter wall elements each having an abrupt incline adjacent the retort, and means to reciprocate said walls.

10. In an underfeed stoker having a retort, a longitudinally movable side wall for said retort means to reciprocate said side wall, fuel feeding members pivoted thereto and having pockets on their outer surfaces, and means to project said members into the fuel as movement of said wall is reversed at one end of its travel and to withdraw said members as movement of said wall is reversed at the other end of its travel.

11. In a furnace, an underfeed stoker having a retort and a discharge opening on opposite sides of the furnace, a ventilated furnace wall forming one longitudinally extended side of said retort, means to move said wall longitudinally, grate members movable transversely with respect to said retort forming the opposite side of said retort, means to feed fuel at one end of said retort and to distribute fuel longitudinally of said retort, and means to reciprocate said members to advance the fuel from said retort to said discharge opening.

In testimony whereof I have hereunto affixed my signature.

ROBERT SANFORD RILEY.